3,738,965
POLYSULFONATE POLYMERS FROM
ADAMANTANE BISPHENOLS
Robert M. Thompson, Wilmington, Del., and Irl N. Duling, West Chester, Pa., assignors to Sun Research and Development Co., Philadelphia, Pa.
No Drawing. Filed Dec. 30, 1971, Ser. No. 214,419
Int. Cl. C08g 25/00
U.S. Cl. 260—49     10 Claims

ABSTRACT OF THE DISCLOSURE

Novel solid polysulfonates having the structure:

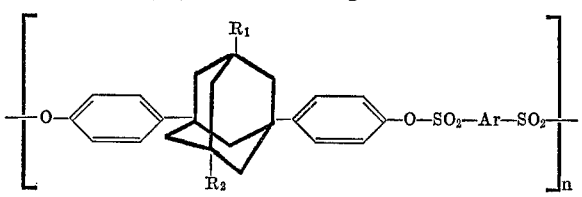

where $R_1$ and $R_2$ are hydrogen or hydrocarbyl radical having 1 to 20 carbon atoms, Ar represents a divalent aromatic hydrocarbon radical and $n$ represents the number of such repeating units which are produced. These thermoplastic resins are valuable in the manufacture of molded and extruded articles.

BACKGROUND OF THE INVENTION

(1) Field of the invention

The present invention relates to polysulfonates wherein the repeating unit contains an adamantane bisphenol moiety.

(2) Description of the prior art

There is a constant effort in the polymer field to provide outstanding new engineering thermoplastics having an unusual combination of properties and the ability to retain these properties under mechanical stress and over a broad temperature range. It is also desired that these thermoplastics have excellent resistance to attack by corrosive chemicals. In addition to the above requirements, the thermoplastics should exhibit processibility and fabricability that allow for high-volume manufacturing. It has now been found, in accordance with the present invention, novel thermoplastic polymers which possess the aforementioned properties and in addition have exceptional oxidation stability and high heat distortion temperatures.

SUMMARY

The present invention is directed to and provides new polymers having the structure:

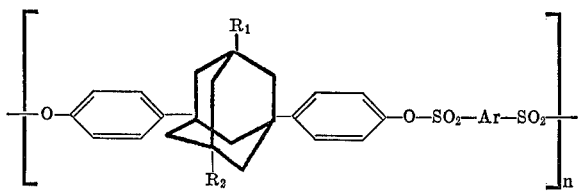

where $R_1$ and $R_2$ are hydrogen or hydrocarbyl radicals having 1 to 20 carbon atoms, Ar represents an aromatic hydrocarbon divalent radical and $n$ represents the number of repeating units. The hydrocarbyl radicals can be selected from the group consisting of alkyl, cycloalkyl, aryl, alkaryl and aralkyl. These thermoplastic polymers have excellent oxidation stability and a high heat distortion temperature. They are useful in producing molded articles like gears, bearings, pulleys, housings, etc. and extruded articles like rods, tubes, pipes, etc.

DESCRIPTION OF THE PREFERRED EMBODIMENTS

The polysulfonates of the invention can be prepared from adamantane bisphenols of the structure:

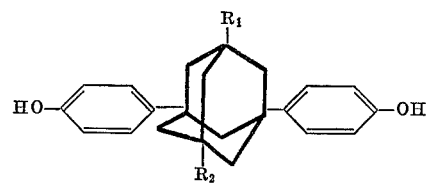

wherein $R_1$ and $R_2$ have the significance previously given and an arylsulfonyl halide. A preferred procedure comprises reacting the adamantane bisphenol and the arylsulfonyl halide in an organic solvent. An amine catalyst such as triethylene amine is generally employed. The resulting reaction mixture is generally maintained at a temperature between 38° and 43° C. to provide a gentle reflux. After the polymerization is completed, the reaction mixture is cooled and poured into 1% hydrochloric acid solution. The polymer layer is separated, extracted with additional acid solution and washed with water until the water is neutral. The polymer is then precipitated by pouring into an alcohol usually methanol and recovered by filtering and drying.

Generally, a stoichiometric ratio of adamantane bisphenol to arylsulfonyl chloride is employed although it is sometimes desirable to use an excess of arylsulfonyl chloride. Reaction conditions of temperature and pressure may vary over a wide range. For example, operable temperatures range between 15° C. and 80° C. and preferably between 30° and 43° C. Similarly, the pressure may range from subatmospheric to superatmospheric but preferably from 15 to 100 p.s.i.

The polymers of the present invention have inherent viscosities in the range of 0.5 to 2.0 ($n=30$ to 100). The inherent viscosity is indicative of the degree of polymerization and is used herein as a measure thereof. Inherent viscosity is represented by the equation:

$$\eta \text{ (inherent)} = \ln \frac{\eta \text{ (relative)}}{C}$$

where $\eta$ (relative)$=t/to$
$to=$flow time through a viscometer of a liquid reference
$t=$flow time through the same viscometer of a dilute solution of a polymer in the reference liquid
$C=$concentration of polymer in solution expressed in grams/deciliter In the example, inherent viscosities ($\eta_{inh}$) were obtained at a concentration of 0.5 gram per deciliter at 100° F. The solvent employed was tetrachloroethane. The polymer configuration was determined by nuclear magnetic resonance and X-ray scan. The polysulfonates of the present invention have exceptional oxidation stability and a high heat distortion temperature. The polysulfonates of the present invention are thermoplastic and are particularly useful in molding operations to produce articles such as gears, bearings, instrument and pump housings, impellers and in extrusion operations to produce articles such as tubes, pipes and rods.

Glass, asbestos, cotton, nylon fibers and glass or mica flakes are useful depending on the ultimate utility of the polymers. The polysulfonates may be obtained in a variety of colors by compounding techniques or by dry blending where organic soluble dyes are used.

The adamantane bisphenols used as starting materials are described in commonly assigned U.S. patent application No. 802,661, filed Feb. 26, 1969 by Robert E. Moore, entitled Adamantane Bisphenols and now U.S. Pat. No. 3,594,427, issued July 20, 1971 and are prepared by reacting a compound of the structure:

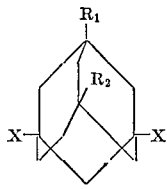

where $R_1$ and $R_2$ are as previously described and X is independently selected from the group consisting of bromo and chloro with an excess of phenol at a temperature in the range of 125° to 200° C. The reaction time for preparing the bisphenols will vary, particularly in regard to the temperature employed, from 4 to 10 hours. In practice, the preferred procedure is to carry out the reaction at reflux which is around 178° to 185° C. (B.P. phenol 183°C.). At reflux, the reaction requires 5 to 7 hours for good yields. No catalyst is required. The reaction takes place in an excess of phenol which also serves as the solvent for the adamantane reactant and the product. The adamantane bisphenol is most easily recovered by cooling the reaction mixture and pouring it into warm water (66° to 80° C.) thus precipitating the bisphenol and dissolving the phenol. The crystalline material is filtered and recrystallized, for example, from xylene, toluene or isopropanol-water.

The adamantane hydrocarbons are well known and their preparation is adequately described in the literature.

The dihalo derivatives can be prepared by reacting the corresponding adamantane hydrocarbon with chlorine or bromine in the presence of $AlCl_3$ or $AlBr_3$ as disclosed in Stetter and Wulff, German Pat. No. 101,410 and Stetter in Angew Chem. International Edit., vol. 1 (1962), No. 6, pages 287–288. The mixed bromo-chloro adamantane can be obtained by reacting a dibromo adamantane with a chlorine donor such as carbon tetrachloride in the presence of a Lewis acid catalyst as shown in the copending application of Robert E. Moore, Ser. No. 688,679, filed Dec. 7, 1967 now U.S. Pat. No. 3,626,017 issued Dec. 7, 1971.

Examples of such suitable reactants to prepare the adamantane bisphenols are the bridgehead dichloro, dibromo or bromo-chloro derivatives of the following hydrocarbons: adamantane; 1-methyladamantane; 1-ethyladamantane; 1,3-dimethyladamantane; 1-methyl-3-ethyladamantane; 1,3-diethyladamantane; 1-n-propyladamantane; 1 - isopropyladamantane; 1 - n-butyladamantane; 1,3 - di-n-pentyladamantane; 1 - methyl - 3 - heptyladamantane; 1 - n-decyladamantane; 1 - n-decyl - 3-ethyladamantane; 1 - methyl - 3 - propyladamantane; 1-isohexyladamantane; 1 - methyl - 3 - cyclohexyladamantane; 1 - phenyladamantane; 1 - methyl - 3 - phenyladamantane; 1,3 - diphenyladamantane; 1 - p-tolyladamantane; 1-benzyladamantane; and the like.

The aromatic disulfonyl chlorides useful in the present invention have the general formula $ClSO_2ArSO_2Cl$, where Ar can be any of the divalent radicals: phenylene, bisphenylene, tolylene, xylylene, naphthylene, anthrylene and the like.

The aromatic disulfonyl chlorides can be prepared by conventional procedures known in the art. For example, 4,4'-bisphenyldisulfonyl chloride is prepared by reacting bisphenyl directly with chlorosulfonic acid.

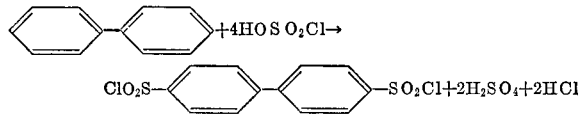

Examples of other suitable aromatic disulfonyl halides are benzene disulfonyl chloride, p-toluene-disulfonyl chloride, p-xylene-disulfonyl chloride, 2-naphthalene-sulfonyl chloride, 1,3 - naphthalene-bis-sulfonyl chloride, 1,5-naphthalene-disulfonyl chloride, 2,7-naphthalene-disulfonyl chloride, 2,6 - naphthalene-disulfonyl chloride, 1,5 - anthracene-disulfonyl chloride, 1,8-anthracene-disulfonyl chloride, 2,6 - anthracene-disulfonyl chloride, 2,7-anthracene-disulfonyl chloride and the like.

The polymerization is preferably carried out in a solvent medium. Most preferably the solvent should be one in which the reactants are soluble at room temperatures. Suitable solvents for the polymerization include methylene dichloride, carbon tetrachloride, tetrachloroethylene, chlorobenzene, o-dichlorobenzene and the like.

An amine type catalyst is preferably employed to initiate the polymerization. Suitable catalysts include triethylamine, benzyl trimethyl ammonium chloride and tetramethyl ammonium chloride. Triethylene amine is preferred.

The following example is presented to further illustrate the invention.

EXAMPLE

Into a dried 100 ml. resin kettle, fitted with a stirrer, thermometer, reflux condenser and dropping funnel were charged 7.02 g. (0.02 mole) of 4,4'-bisphenyldisulfonyl chloride, 6.96 g. (0.02 mole) of 1,3 - bisphenol - 5,7-dimethyladamantane and 50 ml. of methylene chloride (dried over 5A mole sieve). The reactor was fitted with a nitrogen inlet to exclude moisture. Then the stirrer was turned on. Through the dropping funnel, 4.85 g. (0.048 mole) of freshly distilled dry triethylene amine was added slowly over a one-half hour period. The mild exothermic nature of the reaction produced enough heat to maintain a gentle reflux of methylene chloride at this rate of addition.

At the end of the addition, external heat was applied by a heating mantle and refluxing was continued for one hour. The viscous polymer solution was cooled and poured into a water solution containing 1% hydrochloric acid and stirred. The organic layer was separated, extracted with aqueous acid solution then equal volumes of water until the water layer was neutral.

The polymer was then precipitated by pouring into methanol in a Waring Blendor then collected on a Buchner funnel and dried in vacuum at 180° C. The product had an $\eta_{inh}$ of 1.2 in tetrachloroethane.

Unlike the more usual polysulfonates, this polymer is not brittle but tough. The polymer had a heat distortion temperature of 180° C.

Clear tough films prepared by solution casting or by compression molding of the polymers have good physical properties.

As mentioned above, these thermoplastic polymers have excellent oxidation stability and a high heat distortion temperature. They may be molded to produce useful articles like gears, bearings, pulleys, housing etc. The polymers of this invention may also be extruded by conventional means to produce rods, tubes, pipes etc.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood, that within the scope of the appended claims, the invention may be practiced by those skilled in the art and having the benefit of this disclosure otherwise than as specifically described and exemplified herein.

The invention claimed is:

1. A thermoplastic resin having the structural formula consisting essentially of:

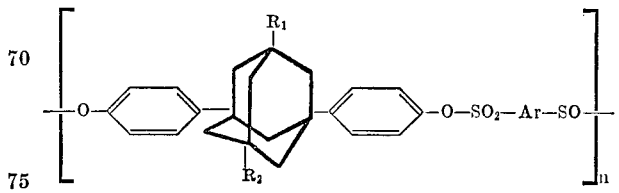

where $R_1$ and $R_2$ are hydrogen or hydrocarbyl radical having 1 to 20 carbon atoms, Ar is divalent aromatic hydrocarbon radical and $n$ is the number of repeating units.

2. The polymer according to claim 1 wherein $R_1$ and $R_2$ are hydrocarbyl.

3. The polymer according to claim 3 wherein the hydrocarbyl radical has 1 to 10 carbon atoms.

4. The polymer according to claim 2 wherein the hydrocarbyl radical is selected from the group consisting of alkyl, cycloalkyl, aryl, alkary and aralkyl.

5. The polymer according to claim 4 wherein the $R_1$ and $R_2$ are selected from the group consisting of methyl and ethyl.

6. The polymer according to claim 1 wherein Ar is selected divalent aromatic hydrocarbon radical group consisting of phenylene, bisphenylene, tolylene, xylene, naphthylene and anthrylene.

7. The polymer according to claim 5 wherein $R_1$ and $R_2$ are methyl.

8. A thermoplastic resin having the structural formula consisting essentially of:

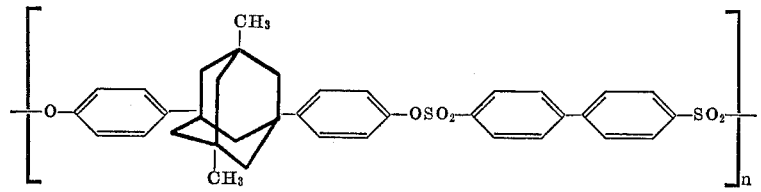

only $n$ is the number of repeating units.

9. The polymer according to claim 1 wherein the inherent viscosity as measured at a concentration of 0.5 gram/deciliter of tetrachloroethane at 100° F. is at least 0.5.

10. The polymer according to claim 8 wherein the inherent viscosity as measured at a concentration of 0.5 gram/deciliter of tetrachloroethane at 100° F. is at least 0.5.

References Cited
UNITED STATES PATENTS 3,401,148   9/1968   Schlott et al. _____ 260—49
3,398,120   8/1968   Hindersinn et al. _____ 260—47

WILLIAM H. SHORT, Primary Examiner

L. L. LEE, Assistant Examiner

U.S. Cl. X.R.

260—33.8 R, 37 R, 37 N P